May 10, 1960
G. H. DAVIS
2,936,075
FILTER
Filed March 4, 1958
2 Sheets-Sheet 1
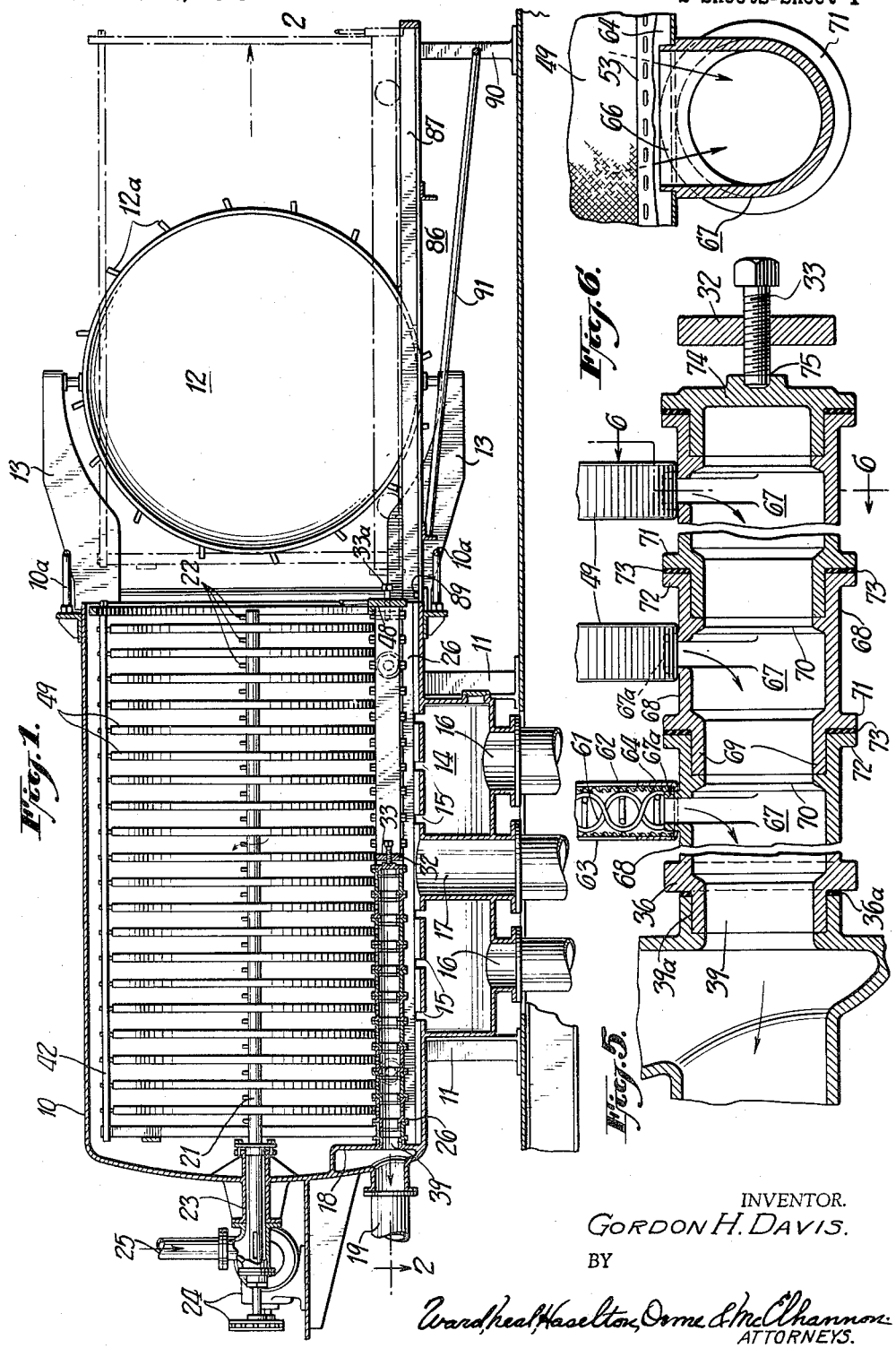
INVENTOR.
GORDON H. DAVIS.
BY
Ward, Neal, Haselton, Orme & McChannon
ATTORNEYS.

May 10, 1960  G. H. DAVIS  2,936,075
FILTER
Filed March 4, 1958  2 Sheets-Sheet 2
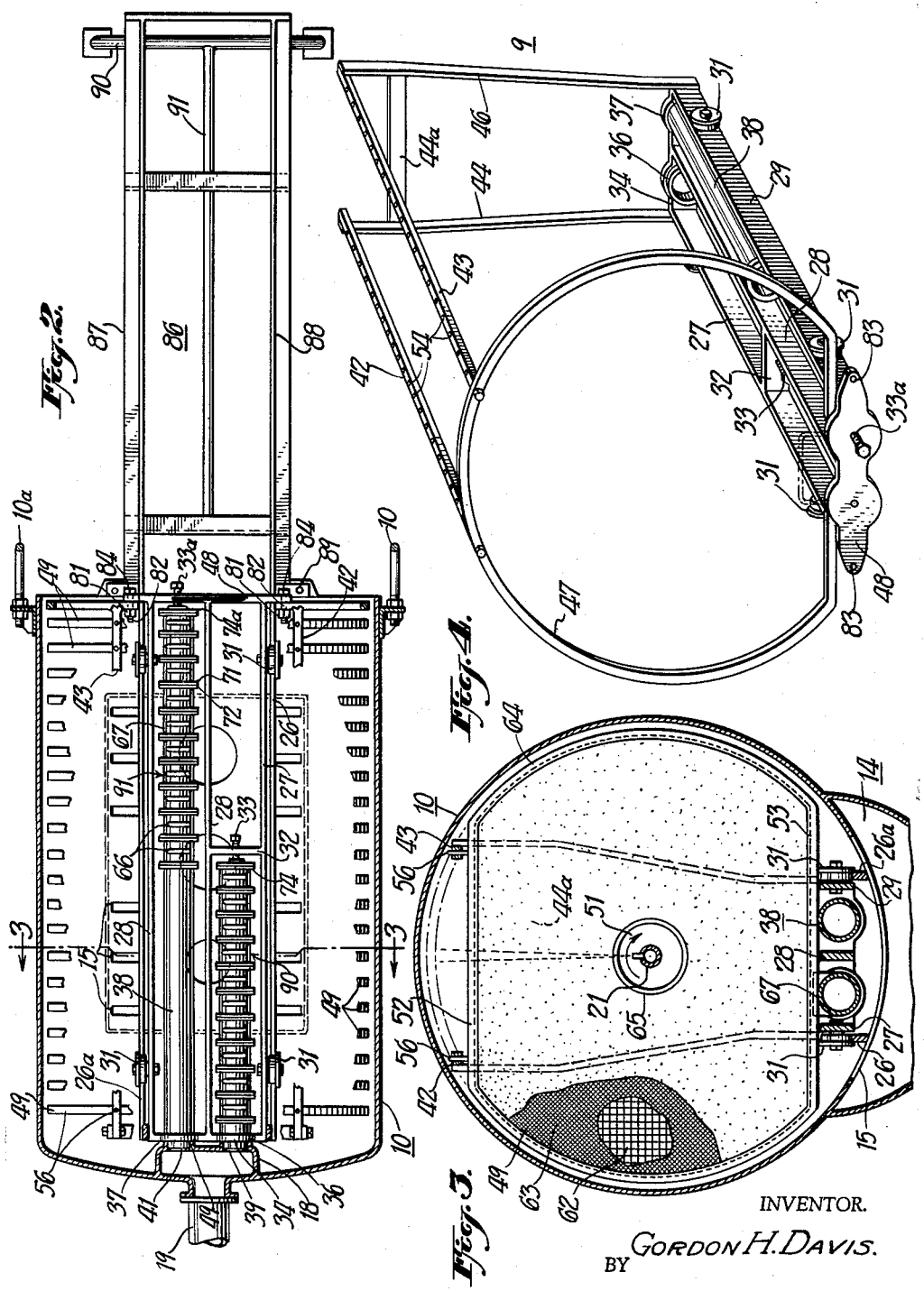
INVENTOR.
GORDON H. DAVIS.
BY
Ward Neal Haselton Orme & McElhannon
ATTORNEYS.

2,936,075
Patented May 10, 1960

2,936,075

FILTER

Gordon H. Davis, New York, N.Y., assignor to Davis Filtration Equipment Co., Inc., New York, N.Y., a corporation of New York Application March 4, 1958, Serial No. 719,091

2 Claims. (Cl. 210—236)

This invention relates to filtering devices and particularly to improvements in filters wherein a number of filter leaves are mounted on a cart within a tank.

In filters of the type to which the present invention pertains, the liquid to be filtered is introduced into a tank under pressure and is filtered by passing through the filter leaves which discharge into a collecting conduit in the tank. From time to time it is necessary to gain access to the filter leaves in order to thoroughly clean, repair or replace them. In earlier filters the filtrate collecting conduit or discharge member is an axially disposed tube with each of the leaves communicating therewith. Accordingly, in order to gain access to the leaves, it has been necessary to remove this central tube, and often the entire assembly has to be dismantled to obtain access to just one leaf. Telescoping filtrate discharge tubes have been developed which of course facilitate removal of the entire outer shaft and filter leaf assembly from the tank. However, each of the leaves in the improved structure is still mounted on a hub which is secured to the outer telescoping shaft and access to a filter leaf in the center of the arrangement has been little simplified by this modification. Thus, hand cleaning and repair of the individual leaves is still a cumbersome and time-cosuming operation, necessitated, it is submitted, by positioning of the discharge member centrally or along the axis of the filter tank so that the leaves must be connected therewith at their centers.

In accordance with the present invention, there is provided a pressure filter in which the leaves are arranged in side-by side vertical arrangement on a cart which is movable in and out of the filter tank on a track and in which the discharge orifice of each of the leaves is positioned at the base of the leaf and communicates with a hollow ring the ends of which are adapted to nest in the base of the cart with an adjacent ring. Means are provided for locking these rings in nested relationship to provide a filtrate discharge conduit along the base of the leaves, one end of which is closed and the other end communicating with the filtrate discharge opening in the tank, preferably at one end of the tank. A quick lock door is provided at the other end of the filter tank, and the cart bearing the leaf assembly may be easily and quickly withdrawn over the track and normal extensions thereof to the outside. In order to work on or replace a central leaf, for example, the locking device which secures the rings in nested relationship is disengaged, and the troublesome filter leaf with its nesting ring is easily removed, while the other leaves remain in their normal position on the cart.

With prior art filter constructions in which the filter leaves are held centrally thereof, the filter leaves have had a tendency to warp or twist during use, making portions of the filter leaves inaccessible to the cleaning fluid, and, therefore, causing clogging of the inaccessible portions of the leaves. Such clogging reduces the rate of flow of the fluid through the filter and makes it necessary to open the filter tank to correct the clogging. With the arrangement of the filter leaves in the present invention, described above, the filter leaves may be supported peripherally at a plurality of points, and therefore warping or twisting of the filter leaves is eliminated or reduced to a minimum.

In filters of the type to which the invention pertains, it is necessary to keep the back pressure in the discharge conduits to a minimum. In other words, it is desirable that the cross-sectional area of the discharge conduit be relatively large if a relatively high rate of fluid flow through the filter is to be obtained. When the filter leaves are centrally connected to a discharge conduit, it is difficult to obtain the desired cross-sectional area of the discharge conduit and the desired filtrate discharge flow. However, with the filter construction of the present invention, it is easy to provide relatively large discharge conduits. In the preferred embodiment of the present invention, one-half of the filter leaves are connected to a first discharge conduit, and the balance of the filter leaves are connected to a second discharge conduit.

In a preferred embodiment the present invention also provides a rotatable manifold or header with spray jets which is centrally and desirably axially disposed in the tank to spray cleaning fluid onto the filter leaves. By reason of the axial filtrate discharge in common use heretofore, it was necessary to place the cleaning fluid header along the wall of the tank, generally at the top, with the spray jets directed downwardly onto the leaves. In accordance with the present invention, wherein filtrate removal is provided for at the periphery and preferably at the base of the filter leaves, much more efficient cleaning is possible with the rotatable axially disposed cleaning fluid manifold.

In the following detailed description of the invention, reference is made to the accompanying drawings, wherein:

Fig. 1 is a longitudinal, medial section through a preferred filter of the present invention;

Fig. 2 is a section taken on line 2—2 of Fig. 1;

Fig. 3 is a section taken on the line 3—3 of Fig. 2;

Fig. 4 is a perspective view of a preferred filter cart forming part of the embodiment shown in the preceding figures;

Fig. 5 is an enlarged, sectional view of one of the filtrate discharge outlets of the tank; and Fig. 6 is a section taken on the line 6—6 of Fig. 5.

Referring now to Fig. 1, the numeral 10 designates the filter tank supported by legs 11 and having an open end which may be closed by door 12 which is suspended by means of hinge arms 13. Arms 13 are hinged on the side of the tank 10 and pivotally support the door 12. The door 12 carries a plurality of radially slidable arms 12a having tapered ends which fit into the U-shaped members 10a mounted on the tank 10 when the door 12 is closed and hold the door 12 in fluid-tight engagement with the end of the tank 10, a suitable gasket (not shown) being provided between the door 12 and the end of the tank 10. The tank 10 has a cylindrical cross-section and is provided with a generally U-shaped sump 14 along its central lower portion to facilitate removal of filtered material from the leaves, which is finally discharged from the sump 14 through outlets 16 therein. Slots 15 in the wall of the tank adjacent the sump 14 permit the flow of solids into this portion of the discharge system. In the apparatus shown, the medium to be filtered preferably enters the tank through inlet line 17 which communicates directly with the tank interior as shown in Fig. 1. While openings 16 in the sump have been described as solids discharge ports and line 17 has been termed the inlet, the material to be filtered may if desired also be introduced to the tank via the sump through openings 16.

A filtrate outlet manifold 18 is provided in the base of the closed end of tank 10 and is flanged exteriorly of the tank to a filtrate discharge line 19.

In the preferred embodiment of the present invention, a rotatable cleaning fluid header 21 bearing a plurality of spray nozzles 22 is axially disposed in the tank. A well-known type of bearing and bushing assembly indicated generally at 23 supports header 21 where it passes through the end of the tank and rotation of the same is effected by means of the motor and gear arrangement indicated generally at 24. Line 25 in Fig. 1 is connected to a source of cleaning fluid for the header 21.

A pair of tracks 26 and 26a, as shown in Figs. 2 and 3, are welded to the bottom of the tank 10 and support a filter leaf cart 9 therein. As shown in Fig. 4, the base portion of the cart consists of three parallel longitudinal members 27, 28 and 29 with outside members 27 and 29 carrying flanged wheels 31 which ride on tracks 26 and 26a. In the preferred embodiment a lateral member 32 is welded intermediate one of the sides and the central base member, between members 27 and 28, for example, approximately equidistant from the ends of the cart. The lateral member is centrally drilled and tapped and fitted with a set screw 33. The inner or forward end member 34 of the cart is provided with a stepped ring member 36 opposite the lateral member 32, and also with a similar ring member 37 intermediate the cart edge member 29 and central member 28. A tubular member 38 which extends rearwardly to a point just forward of lateral member 32 and which is connected to the member 37 is welded to the end member 34 and to the members 28 and 29. The filtrate discharge manifold 18 in the end of tank 10 is provided with a pair of openings 39 and 41 surrounded by rings, e.g., 39a, which receive portions of the members 36 and 37, respectively, in the forward end of the cart 9 when the cart 9 is properly positioned in the tank 10. Suitable gaskets, e.g., 36a, provide a good seal between the end member 34 and the filtrate discharge manifold 18.

The cart 9 is also provided with a pair of overhead members 42 and 43 substantially parallel to the base members 27—29, and which are supported by upright legs 44 and 46 secured to the base members 27 and 29 as shown and also by a preferably generally circular support 47 secured just inwardly of the outer end member 48 of the base. Legs 44 and 46 are braced by a crossbar 44a welded thereto.

A plurality of filter leaves 49 are juxtaposed on the cart 9 as shown in Figs. 1–3. In the preferred embodiment, the filter leaves have an open central portion 51, as shown in Fig. 3, to accommodate the cleaning fluid header 21. Also, the leaves have chordal upper and lower edges 52 and 53, respectively, substantially parallel to each other which facilitate positioning and removal of the leaves from the cart 9. As seen in Figs. 2–4 the overhead supports 42 and 43 are provided with a plurality of small holes 54 through which pins 56 secured to the filter leaves 49 are removably inserted for securing the upper edges 52 of the filter leaves 49 against warping or forward or backward movement. The lower edges 53 bear against the longitudinal members 27—29 and are held by the sections of the discharge conduit hereinafter described.

Referring now to Fig. 5, the filter leaves 49 are constructed of a central, wire, spacer screen 61 covered with a fine mesh wire cloth 62 over which a filter cloth 63 may be placed. The peripheral edges of the leaves are bound with a U-shaped frame member which may, for example, be filter cloth stitched to the cloth 63. The edges around the central opening 51 are bound by U-shaped metal ring 65 (Fig. 3) which imparts rigidity to the structure. Along the lower edge and to one side of the center line of each filter leaf there is an opening or orifice 66 (see Fig. 6) in the U-frame 64 for discharge of the filtrate. An extension 67a on each hollow filtrate receiving member or ring 67 extends into the opening 66, and the filtrate passes from the filter leaf 49 into the ring 67 as indicated by the arrows in Figs. 5 and 6.

The two filtrate discharge conduits 90 and 91 (Fig. 2) are formed, at least in part, by a plurality of the rings 67 and each of the filtrate receiving rings has a tubular portion 68 of a predetermined diameter on each side of the filter leaf discharge orifice 66 and a forward tubular portion of reduced diameter, i.e., a male portion 69 for nesting with the next forward receiving ring as shown in Fig. 5. Rearwardly of its extension 67a each ring bears an interior annular ring 70 against which the forward end of male portion 69 of the next rearward ring 67 seats. The forwardmost receiving ring nests in member 36 (conduit 90) or in the rearward end of the tubular member 38 (conduit 91) which members 36 and 38 communicate with the filtrate receiving manifold 18. The rings are flanged as at 71 and 72 between which gasket material 73 is placed.

As shown in Fig. 5, a male cap or plug 74 is provided for the rearmost filter receiving ring 67. The plug 74 is drilled as at 75 to receive the end of screw 33 which is threaded in the lateral base member 32. As the screw 33 is drawn up the adjacent rings are locked in the position shown in Fig. 5 and forced into the outlet opening 36 in the cart base to form a filtrate discharge conduit 90.

In the preferred embodiment of the present invention, one-half of the filter leaves 49 discharge into the conduit 90 and the balance of the leaves 49 discharge into the conduit 91, the latter being formed by nested rings 67 of the type described in connection with Fig. 5 and by the tubular member 38. The rings of the conduit 91 are held together by an end plug 74a and a screw 33a threaded through the rear end member 48 of the cart base. There are thus two filtrate discharge lines, one handling the forward filter leaves and the other the rear leaves, and while the drawings show the same number of leaves discharging into each conduit, they may be unequal in number. Such a discharge arrangement greatly increases filtering capacity as compared with a filter of equal leaf area having only one central or axial discharge line servicing all the leaves. It is, of course, within the scope of the present invention to extend the discharge conduit 90 so as to receive the filtrate from all the leaves 49 and to omit the conduit 91, but as indicated above, the capacity of such a filter is not as great as in the apparatus illustrated. Likewise, there may be a greater number of discharge conduits each receiving filtrate from a portion of the leaves, although two will generally suffice.

When the cart 9 carrying the filter leaves 49 with rings 67 nested as aforesaid is fully inserted into the tank the forward members 36 and 37 nest in the rings 39a and 41a of the manifold 18 in the end of the tank and the filtrate discharge system is complete. In order to maintain the connections between the manifold openings and those in the base of the cart, the cart 9 is removably locked in position in the tank 10. A variety of locking devices may be provided and one simple arrangement is illustrated in Fig. 2. For example, lugs 81 are welded to the base of the tank adjacent tracks 26 and 26a, a rearwardly projecting threaded pin 82 is welded to each of the lugs for passage through openings 83 in the rear end of the cart, and the cart is secured in the proper position by tightening nuts 84.

In order to support the filter leaf cart when it is removed from the tank a supporting frame 86 is provided having a pair of tracks 87 and 88 which may be bolted to the tank as at 89 for positive alignment with tracks 26 and 26a. The frame is preferably portable and provided with a folding leg member 90 and a brace 91. The broken lines in Fig. 1 indicate the filter leaf cart removed from the tank and on supporting frame 86. Following repair or replacement of the filter leaves, the cart is simply moved axially forward into the tank and locking nuts 84 are taken up, frame 86 is disconnected, the rear door 12 of the tank is closed, and the filter is ready for use.

The rotatable cleaning fluid header 21 which extends axially through the tank through the openings 51 in the filter leaves 49 may be used to clean the leaves 49 without opening the tank 10. Knife-like sprays emanating from the nozzles 22 on the header 21 wash filtered material from the surfaces of the leaves 49 and from the interior wall of the tank 10, the washings being removed by way of the sump 14.

In addition to its many obvious advantages, the present filter also provides improved capacity as compared with the conventional central discharge filter having the same leaf area, and the above described cart and filter leaf construction prevent warping of the leaves. For example, each of the leaves 49 along its upper edge 52 is rigidly held against movement by the pins 56 which pass through the overhead members 42 and 43 of the cart 9. Along its lower edge each leaf is in contact with the base members 27, 28 and 29 and is secured to its respective discharge ring.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. A filter device comprising a tank for receiving the liquid to be filtered having a removable end and a filtrate discharge opening in a portion thereof other than said end, a filter leaf cart separate from said removable end mounted in said tank and adapted to be withdrawn therefrom through the end of said tank after removal of said removable end, said cart comprising a base portion, a pair of filtrate discharge members in one end of the base both communicating with the aforementioned filtrate outlet in the tank, one of said members comprising a tubular member extending toward the opposite or rearward end of the base, upstanding supports on the base and an overhead member secured thereto, a plurality of juxtaposed filter leaves mounted on said cart, each detachably secured at its periphery to said overhead member for preventing longitudinal movement of the peripheries of said leaves, a plurality of hollow filtrate receiving rings mounted in the cart base, the ends of said rings being adapted for nesting with adjacent rings, a plurality of said rings being mounted in line with said tubular member and a further plurality of said rings being mounted in line with the other of said discharge members, a plurality of said leaves each having a discharge orifice communicating with one of the first-mentioned plurality of filtrate receiving rings and a plurality of said leaves each having a discharge orifice communicating with one of said further plurality of rings, means for releasably locking said rings in nested relationship, and means for releasably locking said cart in the tank.

2. A filter device comprising a tank for receiving the liquid to be filtered having a removable end and a filtrate discharge opening in the other end, a rotatable cleaning fluid header extending from said other end and generally axially and longitudinally through said tank, a filter leaf cart mounted in the tank and adapted to be withdrawn through the end of said tank after removal of said removable end, said cart comprising a base portion and having a pair of discharge openings in one end communicating with the filtrate discharge opening in the tank, a plurality of spaced, juxtaposed filter leaves mounted on said cart and each having a centrally disposed opening therethrough, said leaves being mounted with said header extending through said openings, a plurality of filtrate receiving rings positioned end to end in the cart base and in two separate groups, each said ring being adapted for nesting with adjacent rings, the rings of one said group being positioned to one side of the longitudinal center line of the cart base and the other said group being positioned on the other side of said center line, means exterior to said rings for releasably locking said rings in nested relationship to form a pair of filtrate discharge conduits with one said conduit communicating with one of said discharge openings in the cart base and with the other said conduit communicating with the other said opening in the cart base, a plurality of said leaves each having an opening therein permitting the passage of filtrate from the interior thereof into one said ring in said one group but being unconnected for filtrate passage into said other group and the remainder of said leaves each having an opening therein permitting passage of filtrate from the interior thereof into one said ring of the other said group but being unconnected for filtrate passage into said one group, and spray nozzles mounted on said header and directed between each of said filter leaves.

References Cited in the file of this patent

UNITED STATES PATENTS

| Re. 14,213 | Sweetland | Nov. 7, 1916 |
| 1,264,635 | Graham | Apr. 30, 1918 |
| 1,813,073 | Naugle | July 7, 1931 |
| 2,732,079 | Hunziker | Jan. 24, 1956 |
| 2,843,267 | Anderson | July 15, 1958 |

FOREIGN PATENTS

| 276,806 | Germany | July 23, 1914 |
| 291,316 | Germany | Apr. 13, 1916 |